Oct. 13, 1942.    C. H. ZIMMERMAN    2,298,729
MOLD
Filed Aug. 24, 1938
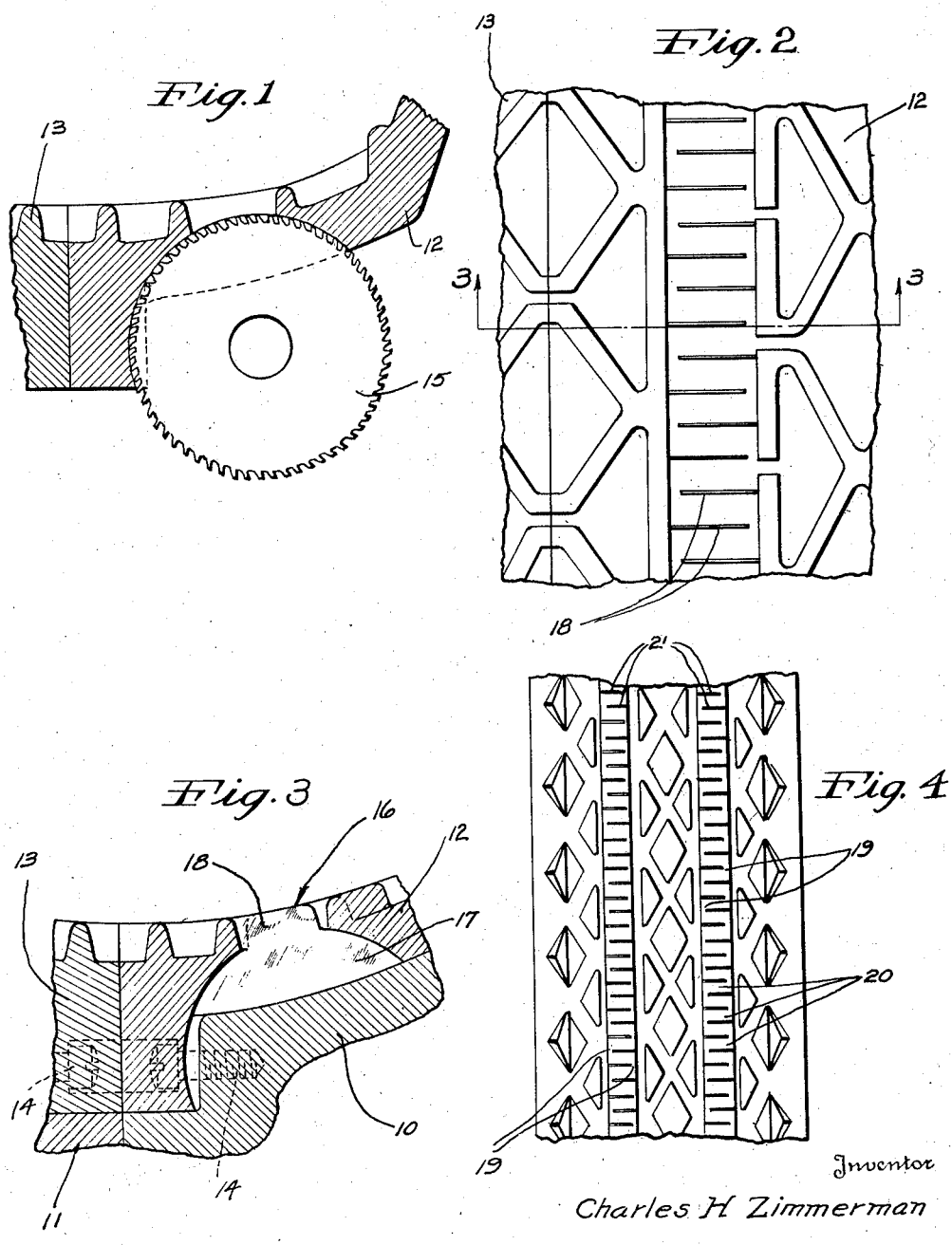
Inventor
Charles H Zimmerman
By
Attorney Patented Oct. 13, 1942

2,298,729

UNITED STATES PATENT OFFICE 2,298,729

MOLD

Charles H. Zimmerman, Akron, Ohio, assignor to Wingfoot Corporation, Wilmington, Del., a corporation of Delaware Application August 24, 1938, Serial No. 226,461

11 Claims. (Cl. 18—38)

This invention relates to molds for automobile tires, and more particularly to molds that are provided with either segmental or full-circle inserts which are usually formed of cast aluminum, and secured in the main mold cavity by the use of machine screws. These inserts are generally cast and have their inner surfaces shaped to form the tread portion of a tire.

No matter what kind of metal is used for casting these inserts it is not practical to efficiently cast projecting ribs on the metal that will mold grooves in the rubber tread which will be approximately one-sixteenth of an inch in width or less.

It has been found that transverse slits or very narrow grooves in the tread or certain raised portions of the tread of a tire will provide said tire with more traction, or road-gripping power and hence quicker stopping. Heretofore this has been accomplished by lateral slitting or knifing the tread of a tire after same has been cured. This requires extra labor and equipment which adds considerable to the cost of the product.

An object of this invention is to mold these narrow grooves in the tire tread, thus eliminating the necessity of cutting these grooves after the tire has been molded, and also eliminate the extra equipment and labor attendant thereto by providing the cast aluminum inserts with very thin sheet metal plates, which are forced into place and held therein by the backing of the main mold, as will be described later.

By securing these very thin sheet metal plates in the inserts it is possible to mold slots in the tread, or portions of the tread, that will be approximately one sixty-fourth of an inch in width. The distance between the grooves or slots is governed by the type and size of the tire, and the configuration of the tread, but in all cases a sufficient number of blocks thus formed between the slots or grooves are in contact with the road when the tire is in use under normal conditions. The blocks are normally radial with respect to the center of the tire, but when under load the blocks in contact with the surface of the road lean one upon the other, which presents a sort of sawtooth effect thereto. By this leaning or bent-over position the corners of the blocks will present themselves to the surface of the road and by such action the gripping or traction qualities of a tread so formed will be increased.

Another object of this invention is to provide a novel means of providing slots to receive the thin metal plates in the mold. This is accomplished by a simple milling operation.

The grooves formed in the tread of a tire by the thin plates or auxiliary inserts are of such narrow width that stones or other hard objects can not lodge and remain in same where damage or excessive wear to the blocks might result.

Other objects, features and advantages will be apparent in the following description and when taken in connection with the accompanying drawing in which one form of the invention is illustrated.

Fig. 1 is a fragmentary sectional view showing how the mold inserts are slotted to receive the auxiliary inserts;

Fig. 2 is a fragmentary plan view showing auxiliary inserts in position;

Fig. 3 is a fragmentary sectional view taken on the line 3—3 of Fig. 2;

Fig. 4 is a plan view of a tire tread illustrating the narrow grooves in portions thereof.

My invention is applicable to tire molds that are in most common use in the automobile tire industry and which are composed of two mating sections 10 and 11 (see Fig. 3), the outer portion of the mold cavity being machined out to receive the cast metal inserts or tread-forming members 12 and 13 which are securely fastened in the mold sections by the screws 14, but before these tread-forming sections are secured in the mold they are provided with thin fin-like plates or auxiliary inserts, in the following manner.

The tread-forming members or inserts 12 and 13 are provided with slots, these slots being cut through from the back surface of the inserts by a circular milling cutter 15 (see Fig. 1), the length of the slot being governed by the size of the cutter 15 and the depth it is permitted to travel. Cutting these slots through from the back face of the inserts 12 and 13 assures cutting through only those portions that are desired to be slotted without defacing the adjacent tread-forming surfaces.

When the slots in the tread-forming members have been properly cut and spaced about the periphery of the members 12 and 13 thin plates 16 are forcibly inserted into the slots. These thin segmental plates are stamped or cut out of thin sheet metal. The body portion 17 is shaped to conform to the groove which is formed by the milling cutter 15, and has a radial projection 18 which projects through the slots, where it is in a position to form the narrow grooves in the treads of tires when the tire is molded.

As shown in Fig. 2 it will be noted that the thin plates are offset with respect to this particular tread member which is desired to be grooved. This offset arrangement prevents the thin plates from forming grooves all the way across the tread member. This permits a staggered margin 19 to be formed which ties the blocks 20 together so that they will have the proper amount of rigidity without affecting the gripping or non-skid action of the blocks, but in certain cases this may not be necessary.

I do not wish to limit myself to the use of inserts for the specific purpose shown as the invention is applicable to molds of various designs. The principal purpose of the invention is to provide the mold with thin metal plates of a thickness which is less than what can be readily cast in a mold of this character.

In Fig. 4 is illustrated a tire tread molded in accordance with the teachings of this invention. The grooves 21 are spaced according to the size and type of tire being molded, and it will be apparent from the foregoing description that a mold prepared in this manner will be capable of molding very narrow grooves and eliminate the necessity of slitting or cutting after the tire is molded. These thin plates can be so positioned in the mold that they may provide grooves in the various tread elements and at different angles, depending on the type of tread design it is desired to groove.

By this method of molding grooves in the tread of a tire, the grooves are of such narrow width that the maximum gripping and non-skid qualities will be obtained and the grooves will be more uniform than those that have been slit by cutting across the tread with a knife, and the rubber block formed between the grooves will wear longer because, when a slit is made with a knife there is a tendency for the rubber to tear at the bottom of the cut, or in this case at the base of the rubber block, due to flexing under load at normal conditions. The knife-cut slit will tend to tear deeper or tear at right angles to the base of the rubber block. This does not happen when the grooves are molded in a tread because a cut or tear has not been started but the rubber at the bottom of the groove is in its natural molded state, which is highly desirable. The edges of the inserts which project into the mold recess may be rounded to produce fillets at the bottom of the grooves in the finished tire and thus further guard against tearing of the rubber.

I do not wish to be limited in my invention to the use of a tool such as illustrated in Fig. 1 or to the shape of the slot showing the principal feature of this invention to be forming a slot for the reception of the plate 16 and to preferably make the base portion 17 thereof fill the slot in the mold. However, the plate can be secured in place by other means, as by welding and the like, after it has been inserted in the mold.

Although I have illustrated and described one preferred manner in which the invention may be practiced, it will be apparent to those skilled in the art that the method is not so limited but that various modifications may be made therein without departing from the spirit of the invention or the scope of the appended claims.

I claim:

1. A device of the class described comprising a mold part having a mold recess in one side thereof, a narrow slot in said part communicating with said mold recess and the outer face of said part and a preformed thin metal plate in said slot projecting into said recess and to the outer face of said part, the said slot being greater in a longitudinal dimension adjacent the outer face of the mold than adjacent the mold recess and said preformed metal plate having a portion shaped to fill the slot adjacent the outer face thereof to prevent inward movement of said plate beyond a predetermined point, said portion of said plate which is adapted to project into said mold recess being of a width and length not greater than the smallest corresponding dimensions of said slot, whereby the plate may be inserted in said slot into said recess from the open side thereof at the outer face of said mold part.

2. A device of the class described comprising a mold part having a mold recess in one side thereof, a narrow slot in said part communicating with said mold recess and the outer face of said part and a preformed thin metal plate in said slot projecting into said recess and to the outer face of said part, the said slot being greater in its longitudinal dimension at said outer face than adjacent the mold recess and said preformed metal plate being shaped to conform substantially to said slot, said portion of said plate which is adapted to project into said mold recess being of a width and length not greater than the smallest corresponding dimensions of said slot, whereby the plate may be inserted in said slot into said recess from the open side thereof at the outer face of said mold part.

3. A device of the class described comprising a mold part having a mold recess in one side thereof, a narrow slot in said part communicating with said mold recess and the outer face of said part and a preformed thin metal plate in said slot projecting into said recess and extending to the outer face of said part, said slot having the end walls thereof forming arcs of the same circle and the adjacent edges of said metal plate being shaped to conform to the shape of the end walls of said slot, said portion of said plate which is adapted to project into said mold recess being of a width and length not greater than the smallest corresponding dimensions of said slot, whereby the plate may be inserted in said slot into said recess from the open side thereof at the outer face of said mold part.

4. A device of the class described comprising an outer mold section, an inner tread-shaping mold section arranged with its outer peripheral surface in engagement with said outer mold section and secured thereto, a narrow slot in said inner section extending in a generally perpendicular direction away from the engaging surfaces of said inner and outer mold sections, a preformed thin metal plate in said slot and having a portion extending inwardly beyond the inner face of said inner mold section, a shoulder on said plate for limiting the amount said plate will extend inwardly beyond the said latter face, and a cooperating shoulder in said slot, said shoulders being so located with respect to each other that when they are in engagement with each other the outer edge of said plate is substantially in engagement with the outer mold section, whereby said plate is securely locked in operative position, said inwardly extending portion being of a size to pass through said slot.

5. A device of the class described comprising a mold part having a mold recess, a relatively narrow slot in said mold part communicating with and extending away from said recess to an outer face of said part, a preformed thin metal plate in said slot having a thickness substantially the width of said slot, and having a portion adapted to project into said recess when said plate is in said slot, said portion being of a size to pass through said slot when said plate is inserted in said slot from the outer end of said slot, and said plate having another portion of a larger dimension than the narrowest part of said slot in at least one direction to limit the amount said portion will project into said recess.

6. A device of the class described comprising a mold part having a mold recess, a relatively narrow slot in said mold part communicating with and extending away from said recess to an outer face of said part, a preformed thin metal plate in said slot having a thickness substantially the width of said slot, the said thickness being substantially less than that which can be successfully cast as a part of said mold, and having a portion adapted to project into said recess when said plate is in said slot, said portion being of a size to pass through said slot when said plate is inserted in said slot from the outer end of said slot, and said plate having another portion of a larger dimension than the narrowest portion of said slot in at least one direction to limit the amount said portion will project into said recess.

7. A device of the class described comprising a mold part having a mold recess, a relatively narrow slot in said mold part, not over one-thirty second of an inch in width, communicating with and extending away from said recess to an outer face of said part, a preformed thin metal plate in said slot having a thickness substantially the width of said slot and having a portion adapted to project into said recess when said plate is in said slot, said portion being of a size to pass through said slot when said plate is inserted in said slot from the outer end of said slot, and said plate having another portion of a larger dimension than the narrowest portion of said slot in at least one direction to limit the amount said portion will project into said recess.

8. A device of the class described comprising a mold part having a mold recess, a relatively narrow slot in said mold part of approximately not over one-sixty-fourth of an inch in thickness, communicating with and extending away from said recess to an outer face of said part, a preformed thin metal plate in said slot having a thickness substantially the width of said slot and having a portion adapted to project into said recess when said plate is in said slot, said portion being of a size to pass through said slot when said plate is inserted in said slot from the outer end of said slot, and said plate having another portion of a larger dimension than the narrowest portion of said slot in at least one direction to limit the amount said portion will project into said recess.

9. In combination in a mold for rubber tires, a base mold having a toroidal cavity and comprising a plurality of mating parts, a plurality of mold inserts lining the toroidal cavity of the base mold, said inserts having narrow slots extending therethrough from their inner to their outer surfaces, a plurality of thin plates, one plate being received in each slot and having a portion extending into the toroidal cavity of the mold, and means for releasably securing the inserts in the base mold and for simultaneously holding the plates rigidly in the slots.

10. In combination in a mold for rubber tires, a base mold having a toroidal cavity and comprising a plurality of mating parts, a plurality of mold inserts lining the toroidal cavity of the base mold, said inserts having narrow slots extending therethrough from their inner to their outer surfaces, a plurality of thin plates, one plate being received in each slot and having a portion extending into the toroidal cavity of the mold, and having a portion adapted to be clamped between the base mold and the insert, and means for releasably securing the inserts in the base mold and clamping portions of the plates between the base mold and the inserts.

11. In combination in a mold for rubber tires, a base mold having a toroidal cavity and comprising a plurality of mating parts, a plurality of mold inserts lining the toroidal cavity of the base mold, said inserts having narrow slots extending therethrough from their inner to their outer surfaces, a plurality of thin plates, one plate being received in each slot and having a portion extending into the toroidal cavity of the mold and a portion engaging with the base mold, and means for securing the inserts in the base mold.

CHARLES H. ZIMMERMAN.

CERTIFICATE OF CORRECTION.

Patent No. 2,298,729.   October 13, 1942.

CHARLES H. ZIMMERMAN.

It is hereby certified that error appears in the printed specification of the above numbered patent requiring correction as follows: Page 2, first column, line 75, claim 1, after "being" insert --greater--; and that the said Letters Patent should be read with this correction therein that the same may conform to the record of the case in the Patent Office.

Signed and sealed this 26th day of January, A. D. 1943.

Henry Van Arsdale,
Acting Commissioner of Patents.

(Seal)